July 24, 1962

J. R. HAMPSON 3,046,462

ELECTRIC MOTOR CONTROL

Filed Aug. 12, 1959

INVENTOR.
JAMES R. HAMPSON.
BY Ashworth Martin
his ATTORNEY.

July 24, 1962

J. R. HAMPSON 3,046,462

ELECTRIC MOTOR CONTROL

Filed Aug. 12, 1959

INVENTOR.
JAMES R. HAMPSON.
BY Archworth Martin
his ATTORNEY.

United States Patent Office 3,046,462
Patented July 24, 1962

3,046,462
ELECTRIC MOTOR CONTROL
James R. Hampson, 2442 Dewey St., Munhall, Pa.
Filed Aug. 12, 1959, Ser. No. 833,217
7 Claims. (Cl. 318—259)

This invention relates to an improved relay and wiring for electrical apparatus, and has for its object the provision of a relay structure of improved form, and control apparatus therefor, so arranged that the electrical motor cannot be accelerated so rapidly nor plugged (reversed while running in either direction) so quickly as to result in over-loading of the electrical system and consequent damage to the motor.

The polarized plugging and accelerating relay described herein will be part of, and will operate in connection with an automatic, or semi-automatic, magnetic controller, of the conventional type, for starting, stopping and reversing a direct current electric motor.

It provides automatic control of all the accelerating contactors, of the magnetic controller, by connecting the contactor coils to the negative line, when disconnecting the contactor coils from the negative line when the electric motor is "plugged" (reversed while running in either direction) until the motor stops. It prevents the operator from plugging the electric motor with less than the entire starting resistance in circuit with the motor.

My system also provides automatic control of the last of a plurality of accelerating contactors, by keeping its coil disconnected from the negative side of the conductor until the electric motor has attained a predetermined speed.

Figure 3:
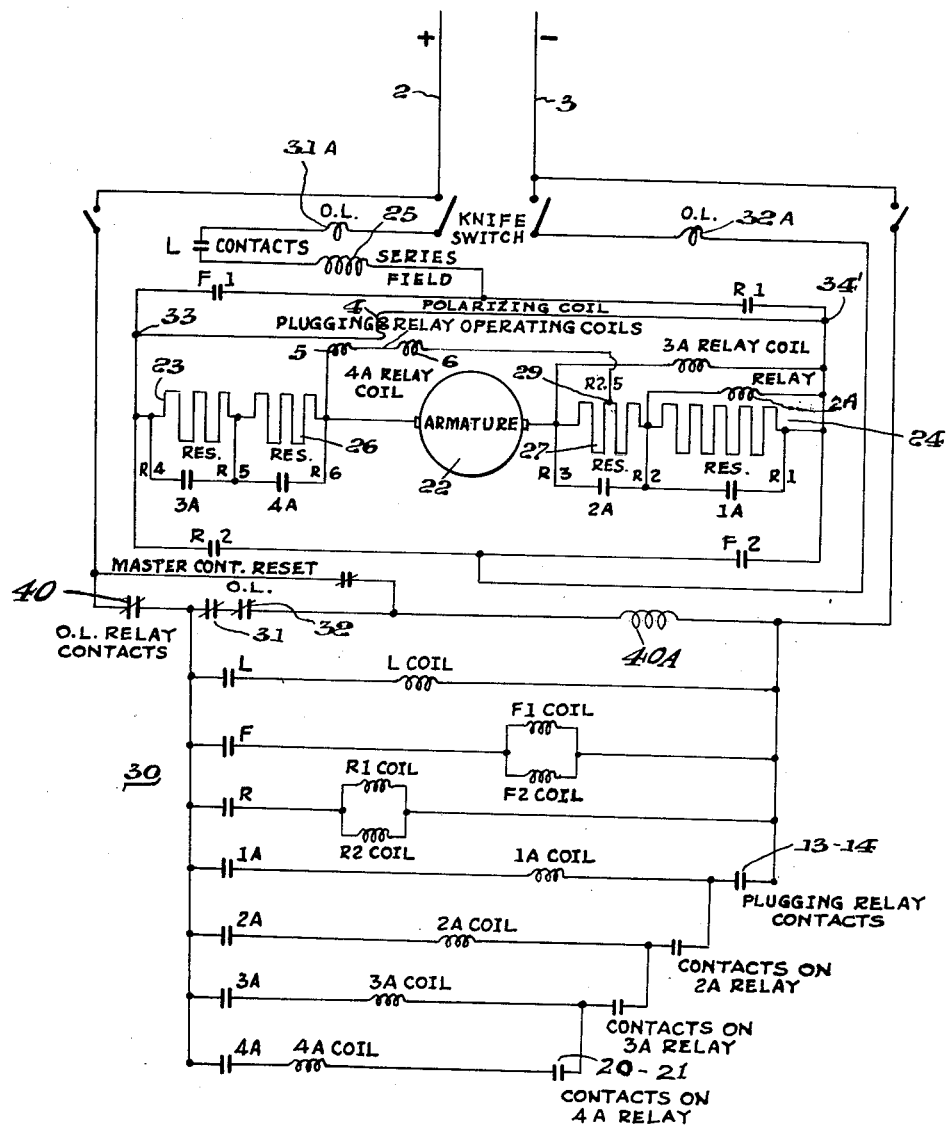
FIG. 3 is a schematic diagram of the wiring, switches and operating coils used with the structure of FIG. 1 and including conventional additional wiring, to assist a customer in installing the system.

As shown in FIG. 3, the contactor and other operating members are supplied with current from a line that has plus and negative conductors 2 and 3.

Figure 1:
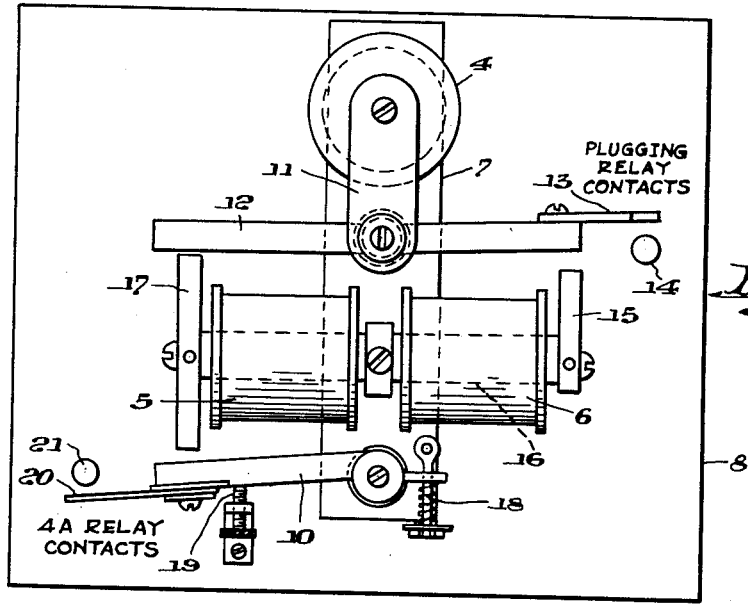
FIGURE 1 is a front view of the polarized, plugging and accelerating relay.

The physical structure of the polarized plugging and accelerating relay is shown in FIG. 1 of the drawings, and in order to make its function clear, I herein describe the magnetic controller in connection with an elementary wiring diagram (FIG. 3) for a magnetic controller, motor, resistance and master controller.

The relay comprises a polarizing magnet 4, two operating magnets 5 and 6. A yoke of iron 7 is supported on the base 8, between the two operating magnets. An accelerating relay contact arm or lever 10, and an iron yoke 11 are positioned forwardly of the polarizing magnet 4. An iron contact lever 12 is hinged to the yoke 11, and has a contact tip 13 that cooperates with a terminal 14 to close a circuit when the lever armature 12 is attracted to an iron end piece 15 on the magnets 5 and 6 that have a core 16. An iron end piece 17 is at the other end of the magnet core 16.

A spring-tensioned eye bolt and spring assembly 18 on the hinged end of the accelerating relay contact lever 10 holds the lever yieldably against an air gap adjusting post and screw 19. At its other position, the lever 10 closes a pair of contact members 20—21.

The polarizing magnet coil 4 is connected across the motor armature 22 and the starting resistance 23 and 24. It is in series with the series field coils 25 of the electric motor, but the direction of electric current and magnetism in the magnet 4 along with the armature 22 and starting resistance 26 is reversible when electric current is applied forwardly or reverse, to the electric motor.

Magnetism flows from the front end of the polarizing magnet 4 through the iron yoke 11, to the center hinged contact lever 12 and polarizes the lever in the same direction as the front end of the polarizing magnet 4, throughout the contact lever's full length. The opposite magnetic flow of the polarizing magnet 4 is from the base end of the polarizing magnet 4 through the iron yoke 7 to the center of the operating magnet core 16 and also to the hinged end of contact lever 10.

The operating magnet coils 5 and 6 are connected in series or parallel with each other, across the motor armature and across a section of the starting resistance 26 and 27. When the motor is being started, an auxiliary circuit, equal to the R.I. (resistance times amperes) current from one side of the motor armature 22 to an intermediate connection on resistance panel 27, passes through the operating magnet coils 5 and 6, in the same direction as it flows through the motor armature 22, the current passes through the polarizing magnet 4 in the same direction. The operating magnet coils 5 and 6 and the polarizing magnet coil 4 are connected in such a way that the polarized contact lever 12 is attracted to the iron end piece 15 and repelled by the iron end piece 17, when the motor is started in either direction.

When the motor begins to move the R.I. voltage is increased by electric motive force (E.M.F.) generated by the motor armature, in the operating coils 5 and 6, and after 2A accelerating contactor closes, the operating coils are energized by E.M.F. from the motor armature. The R.I. voltage from R3 to R2.5 is shorted out when the 2A accelerating contactor closes. When the motor attains a predetermined speed, an auxiliary circle of magnetism, becomes strong enough in the magnet core 16, its iron end piece 17, the iron yoke 7 and the contact lever 10, to overcome the air gap between the contact lever 10 and the end piece 17 and to overpower the spring tension at 18, thus closing the 4A relay contacts at 20—21 (FIG. 1).

When the motor is plugged (reversed while running in either direction) the R.I. voltage of the resistance bank R3 to R2.5 and the armature is overpowered by E.M.F. from the armature that maintains the direction of magnetism in the operating magnets 5 and 6 the same as when running, until the motor speed is reduced almost to a stop. The magnetism in the polarizing magnet 4 reverses when the motor is plugged, and causes the polarized contact lever 12 to be attracted to the end piece 17 of the operating magnet core 16 and to be repelled by the end piece 15. This causes the relay to lock open its contacts at 13—14 until the motor speed is reduced to a very low speed.

4A relay does not operate under normal conditions, when the motor is plugged, but if the motor is running at an excessively high rate of speed, it might close its contacts at 20—21, but that would not have any effect, because the circuit that the contacts 20—21 make is broken at another point by the contacts at 13—14 on the plugging relay and the contacts on 2A and 3A relays.

The contact levers 10 and 12 are provided with thin brass bushings in their hinges and thin copper ribbon on the face of the contact levers, where they come in physical contact with the magnet end pieces 15 and 17, to prevent iron-to-iron contact which often causes uncontrolled sticking of the contact levers.

The contact tip 20 on the 4A relay contact lever 10 is electrically insulated from the contact lever 10 so that a connection to the negative-line may be established for the accelerating contactor coil through the contacts of 3A and 2A relays.

The connection of the operating magnet coils 5 and 6 at a point 29 on the R2 to R3 bank of resistance is optional. It may be placed closer to R2 if it is desirable to close 1A accelerating contactor slightly before the motor has stopped.

Unlike other plugging relays that fail under unusual conditions, such as, an overload to start or an excessive motor speed to plug, this relay's action becomes more positive, and even a moderate drop in line voltage, while unfavorable, will not cause this relay to fail or to be adjusted, in fact, there are no adjustments on the plugging part of the relay and it requires no auxiliary contacts or interlocks on the magnetic controller contactors.

The polarized contact lever 12 is slightly heavier on the 5 magnet end, so that gravity will hold it in open contact position when the controller is on the off point. The contacts of this relay do not require arc shields, the relay always makes contact and never breaks contact.

The polarized relay (FIG. 1) is shown on the wiring diagram (FIG. 3) as working in unison with two retarded magnetism decay type relays that control 2A and 3A contactors, but it will supplement any type of accelerating relay.

Counter E.M.F. relay control of 2A and 3A contactors is not desirable in some types of operation, but this relay, controlling 4A contactor is ideal because it can be adjusted to close 4A contactor at an exact, predetermined motor speed, and if the motor cannot attain that speed because of too heavy a load, then the motor should not be connected across the line.

This relay may be mounted as shown in FIG. 1, but it can be mounted in any position if the contact lever 12 is made to balance in such a way as to rest in an open-contact position when the controller is in the off position.

The wiring diagram of FIG. 3 is unique in some respects, in that it provides electric circuits for the polarized relay coils that could not be established in a conventional wiring diagram.

The lower half of FIG. 3, including the master controller 30 contacts and the coils for operating them, as well as the relay contacts at 13—14, 2A—3A, 20—21 are all conventional, and the relay contacts at 1A, 13—14 and 20—21 could be used with some other connecting device. Symbols such as those indicated at 30 represent manually-operable contact members in the master controller, for contactor coils of the magnetic controller, these contact members being normally open. Normally closed relays 31 and 32 are provided that are operated by coils 31A and 32A respectively whenever an overload occurs in the motor circuit. When an overload occurs in the motor circuit, the overload relay contacts at 31 or 32, or both, will open.

When the motor is started, upon closure of the knife switches at the conductors 2 and 3, moving of the master controller 30 to the first point of electrical contact, current from the power line will flow through the switch "L," the motor series field coils 25, the F1 contactor and the F-2 contactor.

The closing of the contactor tips L, F, and F2 provide guides for flow of electrical current from the line 2, the contactor tips at "L," the motor series field coils, F-1 contactor tips to the armature resistance and the relay coils group. At this point, the circuit splits into five parallel circuits, to the right-hand end of the armature group as shown in FIG. 3 and thence through the contact members of F-2, to the side 3 of the line.

This makes a circuit from left to right through the resistance and armature and a parallel circuit through the polarizing coil 4 of the plugging relay, from 33 to 34'. A third circuit is set up from one side of the armature 22, through the relay-operating coils 5—6, from left to right, to a point on R-2 to R-3 resistance, at 29.

Circuit No. 4 is in parallel with a section of resistance R-2, R-1 and extends through the 2A relay coil from left to right. Circuit No. 5 is in parallel through the 3A relay coil, with resistance section R-3 to R-1, from left to right.

When the master controller 30 is advanced forward, contactor coils 1A, 2A, 3A and 4A become connected to the positive line 2, but their circuits are not completed until the plugging relay 13—14 closes and completes a circuit for the 1-A contactor coil to the line. Closing of the contactor 1A shorts out R-1 and R-2 resistance bank, also shorts out the circuit in the 2A relay coil. The 2A relay after a short predetermined time, releases its contact arm to allow it to spring to a closed circuit position that completes a circuit for the 2A contactor coil to the line 3.

When the 2A contacts are closed they short out R-2 to R-3 resistance bank, and by the same connections short out the circuit in the 3-A relay coil. The 3-A relay, after a short predetermined time releases its contact arm to spring into a closed circuit position that completes a circuit for the 3-A contactor coil to the line 3.

The 2-A contactor in closing also shorts out the R-2.5 to R-3 section of the resistance bank R-2—R-3 and thereby puts the plugging relay operating coils 5 and 6 directly across the armature 22, and from that point on the relay operating coils 5 and 6 are energized by current equal to the counter E.M.F. voltage of the armature which, at this time, should be revolving at considerable speed. Even if the armature is prevented from turning, by an overload, when starting, the relay contact arm 12 will be held in closed-contact position by the polarizing coil 4. The 3-A contactor, in closing, shorts out resistance R-4 to R-5 of the resistance bank and leaves only R-5 to R-6 portion of the resistance bank in circuit with the motor. The motor at this point will, under normal operating conditions, increase its speed to such an extent that it will produce a greater counter E.M.F. to such voltage that the circuit through the 4-A relay coils 5 and 6 will be strengthened to a degree where the 4-A relay will close and complete the circuit through 4-A contactor coil to the line 3. The 4A contactor in closing establishes a direct connection for the motor across the power line.

When the motor is reversed, the contactor L and the contactors R-1 and R-2 are closed by operating the master controller in the opposite direction from that at which it started the motor forward. 1-A, 2-A, 3-A and 4-A contactors operate in the same sequence that they do in running forward. The current flows through the motor series field coils from left to right, the same as in running forward, but the current is reversed from right to left in the armature, resistance and relay coils. The relays operate exactly the same as in running forward, although the direction of current has been reversed. When the motor is plugged, that is, when the line current is applied to the armature in the opposite direction from which it is being driven by mechanical force or moving under its own momentum, the direction of current in the motor armature remains the same as when running, until the motor stops revolving.

The current generated by the motor armature 22 when the line current has been reversed, maintains a circuit independent of the line circuit, through the operating coils 5 and 6 of the plugging relay in the same direction as when the motor was being driven by the line current, but the reversed line current changes the direction of the current in the polarizing coil 4 of the plugging relay. This change of direction of current in the polarizing coil without change of direction in the operating coils 5 and 6 causes the polarized contact lever to be attracted to the magnet end piece 17 and locks open its contacts 13—14, thereby preventing 1-A, 2-A, 3-A and 4-A contactors from closing until after the motor has stopped.

The direction of current flow generated by the motor armature 22 develops a counter E.M.F. when the motor is being driven by line current or supplemental E.M.F. when the motor is being driven by its momentum and plugged. This situation is caused by the direction of rotation of the armature and not by the direction of current from the line. Of course, the direction of current generated by the armature 22 when the motor is being driven by line current will always be counter to line current, because the motor when driven by line current rotates in the right way to do this, but if the motor still continues to run forward when the current flow from the line is reversed the direction of current generated by the armature will be with the line and not against it. Therefore, when plugged, it will increase the line voltage in its own resistance circuit and will be held in check only by a greater ampere flow of current through the motor and its resistance circuit.

It will be understood that the magnetic controls can be used instead of manually-operated controls where remote control is desired as in the case of elevator operation, and when the motor, to be operated, is too large for a manual controller.

The wiring scheme provides the motor with a proper starting, plugging and reversing circuit and provides for a reversible circuit through the polarizing magnet coil of the described relay in series with the series field coils of the motor across the power lines, and provides a circuit through the operating magnet coils across a section of starting resistance and the motor armature that reverses with the armature when the motor is started up in either direction and does not reverse direction of current in the operating coils of the relay when the motor is plugged.

Figure 2:
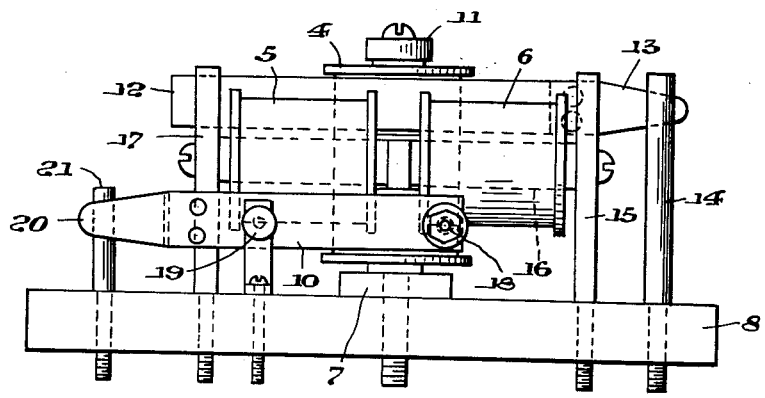
FIG. 2 is a bottom plan view thereof.

The relay apparatus shown in FIGS. 1 and 2 can be used in other ways and for other purposes than as shown and described. For example, in a dynamic brake control to short out part of armature resistance when the motor is being driven by a load instead of the line; and in other circumstances wherein it is desired to automatically control resistance and thereby control motor speed.

I claim as my invention:

1. The combination of an electro-magnetic contactor for a relay circuit, a polarizing electro-magnet and an operating electro-magnet, means for energizing these magnets independently of the relay circuit, an oscillatory polarized contact lever magnetically yoked to one end of the polarizing magnet, pole pieces at opposite ends of the operating magnet, in positions to attract or repel the ends of the lever, depending upon the directions in which current is passed through the coils, a switch closed by the lever when it is rocked in one direction, a second polarized, tiltably-mounted contact lever magnetically yoked to the other end of the polarizing magnet and in the magnetic field of a pole of the operating magnet, switch contacts that are closed by the second contact lever when the said other end of the operating magnet attracts the lever with sufficient force, and means yieldably holding the lever in its open position when not attracted by the operating magnet with sufficient force to move it to switch-closing position.

2. An electro-magnetic contactor for connecting and disconnecting two electrical circuits, that comprises a magnetizable lever pivotally mounted intermediate its ends, a switch contact member on one end of the lever in position to cooperate with a stationary switch contact member to open and close one of the circuits, a polarizing coil magnetically connected to the middle of the lever and energized by a third circuit, two coaxial operating coils through which a core extends, a magnetizable end-piece on one end of the core in position to attract said one end of the switch lever to thereby close one of the circuits when an electric circuit is set up in one direction through the operating coils and the polarizing coil, a magnetizable end-piece at the other end of the core in position to attract the other end of the lever and thereby open the said switch, when either the polarizing coil or the operating coils are energized in the opposite direction, a switch for the other circuit, and a magnetizable switch lever that serves as an armature which, when attracted to the second-named end-piece through energization of the operating magnets, closes the circuit, the last-named lever being magnetically yoked to the said polarizing magnet.

3. A system as recited in claim 2, wherein provision is made for a reversible circuit through the polarizing magnet coil of the relay, in series with the series field coils of the motor and across the power lines, and provision is made for a circuit through the operating magnet coils across a section of starting resistance bank and the motor armature, when the motor is energized in either direction.

4. A system as recited in claim 1, wherein the contact-carrying switch lever is pivotally supported intermediate its ends and one end of the polarizing magnet is magnetically yoked at one of its ends to the lever, the two operating electro-magnets, each having one of its ends magnetically yoked to the other end of the polarizing magnet, the other ends of these operating magnets being placed in position to oscillate the lever, through changes in direction of current flow through the operating magnets by operation of the controller to reverse the motor.

5. A combination plugging and accelerating relay apparatus for direct current reversing motor and control circuits, comprising a polarizing magnet, means for reversing current flow through the magnet, a magnetizable contact lever pivoted intermediate its ends and having a switch contact terminal on one end, a magnetic yoke connecting the polarizing magnet to a mid point on the lever, a second contact lever pivotally supported at one end and having a switch contact terminal on its other end, a pair of axially-alined operating magnets having a core therein whose ends extend to the remote ends of the magnets, a second yoke magnetically connecting the polarizing magnet to a mid point on the core and to the pivoted end of the second-named contact lever, and pole pieces on the ends of the said core in position to independently magnetically attract the ends of the first-named contact lever to effect rocking movement thereof, according to the direction of current flow through the polarizing magnet, to thereby effect opening and closing engagement of the first-named contact member with a switch terminal, one of said pole pieces being in position to attract the free end of the second-named contact lever in order to close switch contacts at its outer end, the last-named lever being normally yieldably held in open-circuit position with respect to the switch contact members.

6. Apparatus as recited in claim 5, wherein when the first-named lever has a given polarity, a pole piece on one end of the core will be of opposite polarity and serve to attract the contact-carrying end of the first-named lever, and a pole piece on the other end of the core will repel the adjacent end of the lever and will attract the free end of the second-named lever.

7. Apparatus as recited in claim 5, wherein north polarity is provided in the first-named contact lever throughout its length, the pole pieces at the opposite ends of the core being always of different polarity with respect to each other, and their polarity being reversed upon reversal of flow in the polarizing magnet.

References Cited in the file of this patent

UNITED STATES PATENTS

| | | |
|---|---|---|
| 2,440,319 | Wickerham | Apr. 27, 1948 |
| 2,475,662 | Dodd | July 12, 1949 |
| 2,611,012 | Baker | Sept. 16, 1952 |
| 2,717,340 | Waters | Sept. 6, 1955 |
| 2,755,423 | Hager | July 17, 1956 |